US010587872B2

(12) United States Patent
Hubbard et al.

(10) Patent No.: US 10,587,872 B2
(45) Date of Patent: Mar. 10, 2020

(54) VIDEO WAVEFORM PEAK INDICATOR

(71) Applicant: Tektronix, Inc., Beaverton, OR (US)

(72) Inventors: John Hubbard, Lake Oswego, OR (US); Todd S. Harlow, Newberg, OR (US)

(73) Assignee: PROJECT GIANTS, LLC, Beaverton, OR (US)

( * ) Notice: Subject to any disclaimer, the term of this patent is extended or adjusted under 35 U.S.C. 154(b) by 0 days.

(21) Appl. No.: 15/642,095

(22) Filed: Jul. 5, 2017

(65) Prior Publication Data

US 2019/0014312 A1   Jan. 10, 2019

(51) Int. Cl.
*H04N 17/02* (2006.01)
*H04N 17/00* (2006.01)

(52) U.S. Cl.
CPC .......... *H04N 17/02* (2013.01); *H04N 17/004* (2013.01)

(58) Field of Classification Search
CPC ..................................................... H04N 17/02
See application file for complete search history.

(56) References Cited

U.S. PATENT DOCUMENTS

| | | | |
|---|---|---|---|
| 5,216,492 A | 6/1993 | Dorrough et al. | |
| 5,469,188 A | 11/1995 | Krishnamurthy et al. | |
| 5,532,024 A | 7/1996 | Arndt et al. | |
| 6,411,623 B1 | 6/2002 | Degollado et al. | |
| 6,542,869 B1 * | 4/2003 | Foote | G10H 1/00 704/500 |
| 7,362,946 B1 * | 4/2008 | Kowald | G11B 27/034 360/13 |
| 2004/0218044 A1 * | 11/2004 | Baker | H04N 17/02 348/186 |
| 2016/0225405 A1 * | 8/2016 | Matias | G06F 16/78 |

FOREIGN PATENT DOCUMENTS

GB      2507729      5/2014

OTHER PUBLICATIONS

European Patent Office, Extended European Search Report and Written Opinion for European Patent Application 18181885.7, dated Oct. 30, 2018, 8 pages, Munich, Germany.

* cited by examiner

*Primary Examiner* — Jefferey F Harold
*Assistant Examiner* — Justin B Sanders
(74) *Attorney, Agent, or Firm* — Miller Nash Graham & Dunn LLP

(57) ABSTRACT

A waveform monitor device, or media analysis device, to monitor a video signal. The waveform monitor device may include an input to receive the video signal, the video signal having a plurality of frames, a memory to store the received video signal, a processor coupled to the memory, and a display. The processor separates the video signal into at least two component signals, for at least one component signal, determines a peak value of the at least one component signal for at least one frame of the plurality of frames, generates a marker at the peak value, determines if the peak value violates a predetermined threshold, and generates an alert when the peak value violates the predetermined threshold. The at least one component signal, the marker at the peak value on the component signal and the alert when the peak value violates the predetermined threshold are displayed on the display to allow a user to quickly determine if a video signal is within a required threshold.

20 Claims, 3 Drawing Sheets

VIDEO WAVEFORM PEAK INDICATOR

FIELD OF THE INVENTION

This disclosure is directed to systems and methods related to test and measurement instruments, such as waveform monitor devices, and, more particularly, to systems and methods for monitoring peak values of interest for videos and images in a waveform monitor device.

BACKGROUND

Waveform monitors are used to monitor both live, saved, and re-played videos and images. A waveform monitor may allow a user to determine if a video reaches a peak value of interest. With the advent of high dynamic range (HDR) video and the usage of waveform monitors in video production, it is necessary for a user to manually determine whether a rendered video remains within a desired range. However, while a video is playing, it can be very difficult for a user to determine when the video is outside the desired range. In some instances, a user may have to click through a video frame-by-frame to determine if any portion of the video is outside the desired range. However, a peak value can be transient and only a single pixel of the image or other small portion may hit the value of interest. As such, it can be difficult to determine when and at what level such a peak occurred.

Examples in the disclosure address these and other issues.

BRIEF DESCRIPTION OF THE DRAWINGS

Aspects, features and advantages of embodiments of the present disclosure will become apparent from the following description of embodiments in reference to the appended drawings in which.

DETAILED DESCRIPTION

Disclosed herein is a waveform monitor device, or media analysis device, to monitor a video signal. The waveform monitor device may include an input to receive the video signal, the video signal having a plurality of frames, a memory to store the received video signal, a processor coupled to the memory, and a display. The processor separates the video signal into at least two component signals, for at least one component signal, determines a peak value of the at least one component signal for at least one frame of the plurality of frames, generates a marker at the peak value, determines if the peak value violates a predetermined threshold, and generates an alert when the peak value violates the predetermined threshold. The at least one component signal, the marker at the peak value on the component signal and the alert when the peak value violates the predetermined threshold are displayed on the display to allow a user to readily determine if a video signal is within a required threshold.

Embodiments of the disclosure allow a user to quickly determine if an image signal is within band for a high dynamic range (HDR), but out-of-band for standard dynamic range (SDR), color spaces, such as REC-709. As discussed in more detail below, a horizontal bar appearing while displaying the video signal provides a quick indicator that the video signal has gone out of range, and allows a user to pause the video and frame step the video signal to find the specific frame that was out-of-band, even if only a single pixel in the frame was out-of-band. This may be useful, for example, if a video has been transcoded from one standard to another standard to determine that the transcoding did not results in any of the video image signal falling outside the standard of which the video signal was transcoded. It may also be useful to determine if an HDR video play without error in an SDR environment.

Figure 1:
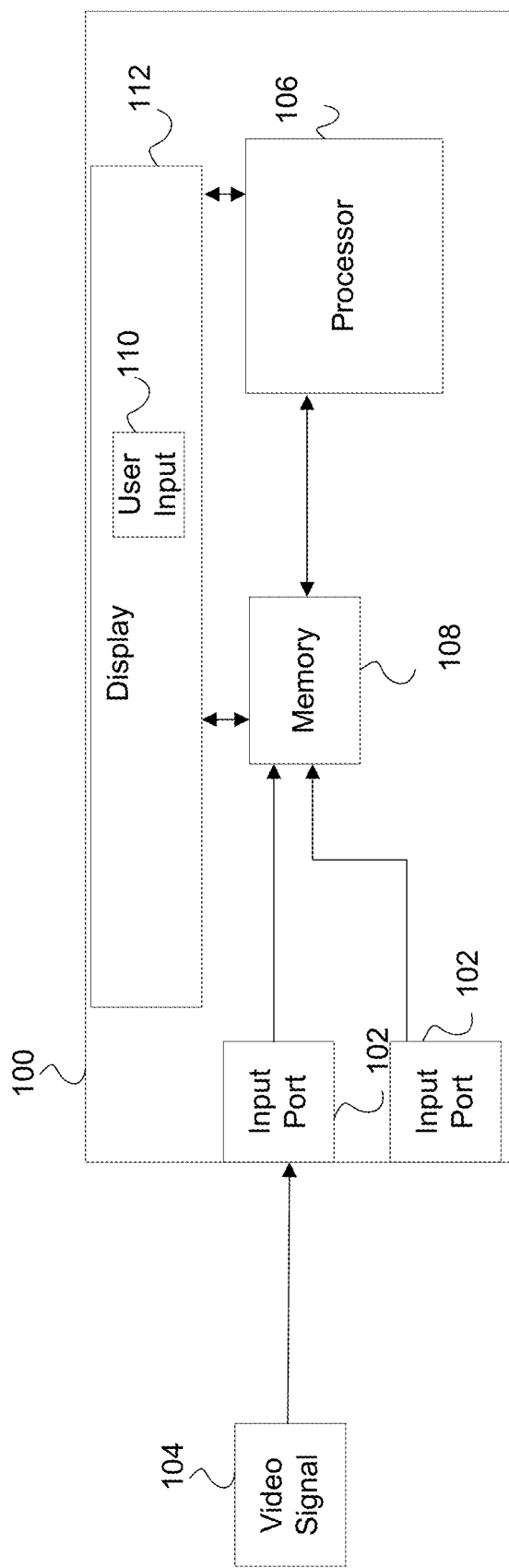
FIG. 1 is a block diagram of an example waveform monitoring device according to some embodiments of the present disclosure.

FIG. 1 is a block diagram of an example test and measurement system to monitor peak values of interest for an image. The image may be a still image or video images, such as a video signal. The test and measurement system includes a test and measurement instrument, such as a waveform monitor 100. The waveform monitor device 100 may include one or more input ports 102 to receive the video signal 104. For example, the one or more input ports may be a serial data interface (SDI), a high definition multimedia interface (HDMI), and/or an internet protocol (IP) input. The one or more input ports 102 may be wired or wireless. For example, the waveform monitor device 100 may include a wireless input 102 to receive IP video signals.

The waveform monitor device 100 also includes a processor 106 to receive the images from the one or more input ports 102 through a memory 108. In some embodiments, however, the processor 106 may directly receive the images from the one or more input ports 102. The processor 106 may be implemented via one or more circuits, in a digital signal processor (DSP), a general purpose processor, a field programmable gate array (FPGA), application specific integrated circuit (ASIC), and/or combinations thereof.

The processor 106 processes the image to determine the color space standard received at the input. The image signal may include metadata that indicates the color space standard of the image signal. Based on the information in the metadata of the image signal, such as a video payload identifier, the processor 106 may determine the color space in which the image is to be displayed. However, the processor 106 may be able to determine the color space standard based on the input signal alone and not based on metadata within the input signal.

Based on this determined color space standard, the processor 106 may select a predetermined threshold from the memory 108 that indicates the allowable range of the image signal for that color space standard. That is, different thresholds may be selected for various color spaces and video quality, such as SDR videos and HDR videos. In some embodiments, however, the waveform monitor device 100 may include a user input 110, such as a dialog box, that a user inputs a desired threshold and range for the image signal, rather than the processor selecting a predetermined threshold.

In some embodiments, the image may contain color differences and may be deconstructed into its color difference portions. For example, the image signal may be provided in an analog YPbPr signal. The processor 106 processes the image signal and outputs the luminance (Y) component of the signal, the difference between the blue and luminance (Pb) component and the difference between the red and luminance (Pr) component to a display 112. The component signals may be displayed based on the voltage of the signal, or in some embodiments, the component signals may be displayed based on the codeword payload of the component signal. The codeword range may be from 0 to 3FF hexadecimal, for example, for SDR and HDR videos. However, depending on the signal received, the code values may take on different meanings. The processor 106 may then alert a user if a code value from an SDR source in an HDR space is out of range, for example.

In other embodiments, the signal may be a RGB signal or a digital YCbCr signal. In such instances, the image signal may be deconstructed into the red (R) component, green (G) component, or blue (B) component or the Y component, blue color difference component (Cb) and red color difference component (Cr). Further, some video signals, such as an IP video signal, may be broken out into multiple components, such as video and audio streams. These streams may then be further separated to analyze the color different portions. Further, in some embodiments, an image signal may have more than three components, such as a Y component as well as a RGB components.

As the processor 106 outputs the component signals to the display 112, the processor compares the signal to the selected threshold and if any of the components of the image signal violate the threshold, then a user may be alerted. In some embodiments, the processor 106 may process an entirety of the image signal and only output the frames to the user that fall outside the selected thresholds. In some embodiments, the processor 106 may also determine the minimum, maximum and average of each component of the image signal.

In some embodiments, the processor 106 may determine and plot the max values of the video signal in its entirety and save the plot to the memory 108. The plot as a whole may then be compared to the predetermined threshold, rather than comparing the video signal as the video runs. A user may then readily determine which frame was outside the range and may pull up the video signal for that frame to determine what pixel is outside the range. Further, this allows the determination of whether the video signal violates a threshold to be run when the video is offline.

In some embodiments, a video signal may be analyzed by the waveform monitor device 100 prior to being compressed to confirm the video fits within the thresholds of the color space and/or standard of the video. If the video signal passes, the video may then be compressed and then the compressed video signal may also be analyzed by the waveform monitor device 100 to determine whether the compressed video remains within the desired range after the compression. This uncompressed and compressed video signals may be analyzed in real-time or after being saved within memory 108.

Other components may be included in the waveform monitor that are not shown in FIG. 1. For example, the waveform monitor may include an analog-to-digital converter, a filter, etc., to coordinate with the processor 106 to output the various component signals of the image signal.

Figure 2:
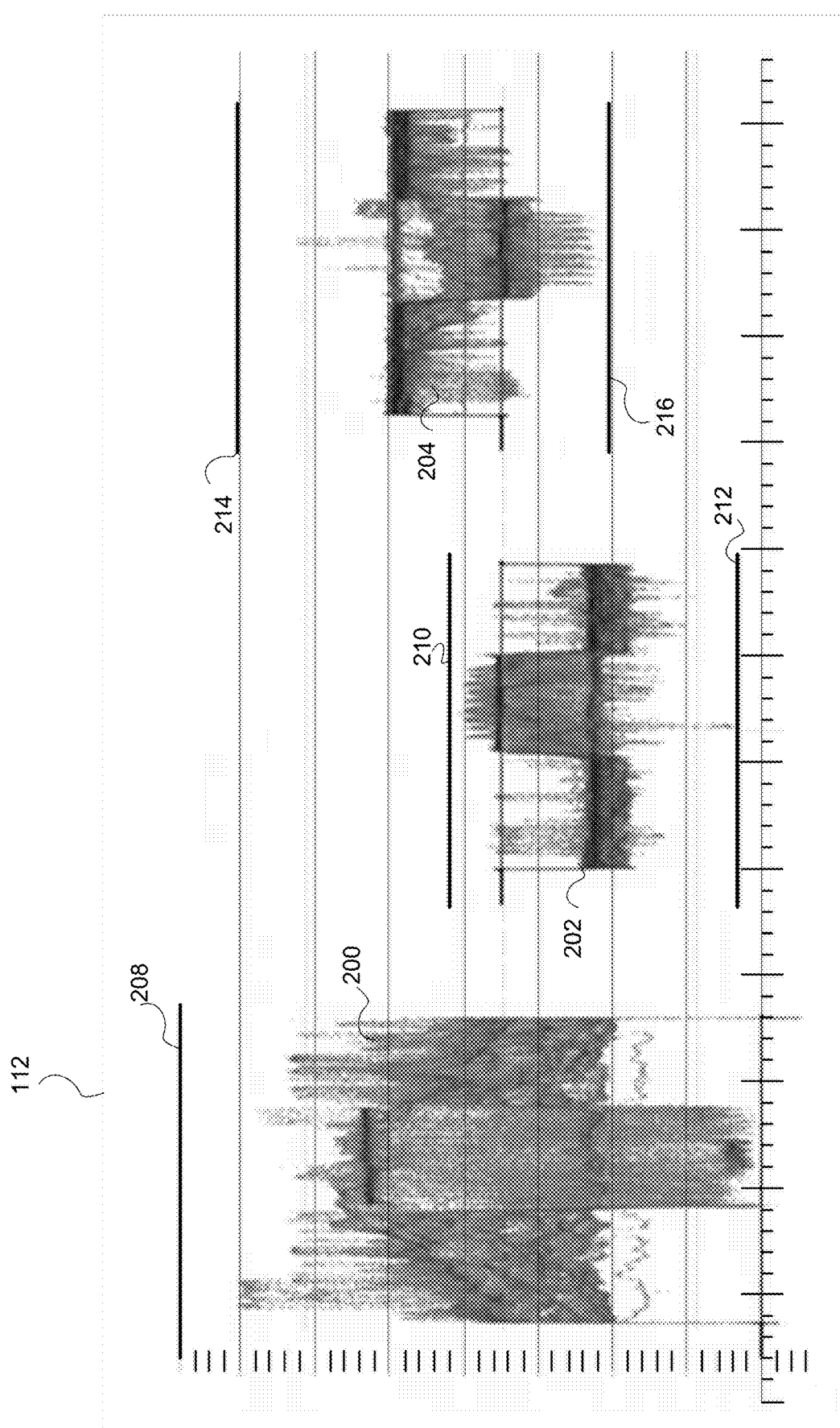
FIG. 2 is an exemplary display displaying the component signals of a video signal, according to some embodiments of the invention.

FIG. 2, for example, illustrates an example display outputting the Y component 200, Pb component 202 and Pr component 204 on the display 112. Starting with the Y component 200, there may be a single threshold to which the Y component signal 200 is compared. A bar 208 moves with the peak of the Y component signal as it is displayed. In some embodiments, the color of the bar 208 may change depending on how close the Y component signal 200 is to the predetermined threshold. For example, the bar 208 may be white when the Y component signal 200 is within range for the color space standard the image signal is being tested for, the bar 208 may be yellow if the Y component signal 200 is nearly out of range, and the bar 208 may turn red if the Y component signal 200 goes out of range.

In some embodiments, the bar 208 has persistence over multiple frames so that a user can visually see that the video went out of range. Otherwise, the peak may go out of range so infrequently that it would be difficult to determine when the peak went out of range and in which frame it occurred. The persistence may be programmable by the user. Further, the color of the bar 208 may also be programmable by a user.

A horizontal bar appearing as the video plays back allows a user to quickly determine by a visual indication that the video is outside of range for the desired color space. A user may then pause the video and frame step the video to find the specific frame that was outside the range of the desired color space standard, even if only a single pixel in the frame was outside the color space standard. This is an improvement over the current systems in which a user may step through a video frame by frame to analyze each frame to determine if the image signal falls outside the range of the desired color space. The current systems require a user to sit and step through a video signal frame by frame and analyze each frame to determine if any pixel or other small portion of the video is outside a threshold, which results in a very time consuming and potentially inaccurate process.

The Pb component 202 and Pr component 204 may also include one or more bars 210, 212, 214, 216. The bars 210-216, like bar 208, may change color as the image signal is played back based on whether the component signal is near, below, or above the selected threshold. In FIG. 2, the Pb component 202 and Pr component 204 each have an upper threshold, 210 and 214, respectively, and a lower threshold 212 and 216, respectively, within which the Pb and Pr component 202 and 204 signals fall.

Figure 3:
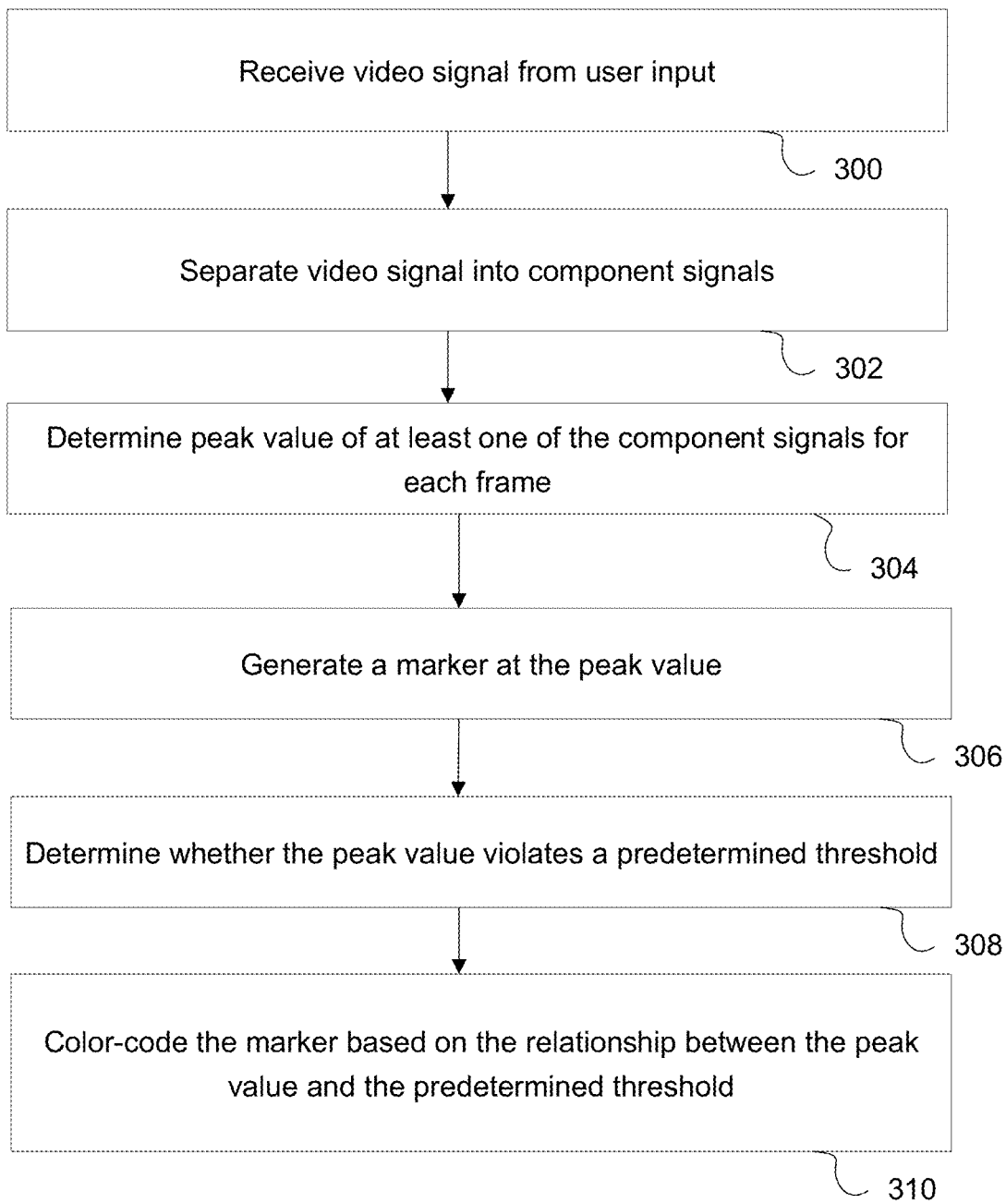
FIG. 3 is a flow chart illustrating an example method for displaying the component signals of FIG. 2, according to some embodiment of the present disclosure.

FIG. 3 illustrates a flow chart for a method of displaying the video component signals, as illustrated in FIG. 2, for example. Initially, a video signal is received 300 from the user input. The video signal is then separated 302 into at least two component signals. As seen in FIG. 2, the video signal of FIG. 2 has been separated into three component signals. The peak value of at least one of the component signal is determined 304 for each frame of the plurality of frames. This may be done by converting the voltages of the video signal into data and plotting the data on the display. In other embodiments, the voltages of the video signal themselves may be used to plot the video signal on the display. In either situation, the predetermined thresholds are selected based on the information being plotted, either the voltage of the video signal or the voltages converted to data.

A marker is generated 306 at the peak value and may be displayed to a user on the display. The waveform monitor device then determines 308 whether the peak value violates a predetermined threshold. Each component signal may have one or more predetermined thresholds. The generated marker may be color-coded 310 based on the relationship between the peak value and the predetermined threshold. For example, if the peak value is less than the predetermined threshold, the marker may be white. If the peak value is near the predetermined threshold, the marker may be yellow. And if the peak value violates the predetermined threshold, the marker may be red.

Changing the color of the marker allows a user to visually see when the video goes outside a component range, so the user can determine quickly and easily which frame is outside the range. This provides a large time savings from previous methods of stepping the video signal frame by frame to determine if any pixels are outside the range of the selected color space.

The method also may include, as discussed above, either receiving the desired range and predetermined thresholds from a user input or selecting the predetermined thresholds from the memory based on the determination of the standard and/or color space of the video signal.

Examples of the invention may operate on a particularly created hardware, on firmware, digital signal processors, or on a specially programmed general purpose computer including a processor operating according to programmed instructions. The terms "controller" or "processor" as used herein are intended to include microprocessors, microcomputers, ASICs, and dedicated hardware controllers. One or more aspects of the invention may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a computer readable storage medium such as a hard disk, optical disk, removable storage media, solid state memory, RAM, etc. As will be appreciated by one of skill in the art, the functionality of the program modules may be combined or distributed as desired in various examples. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

Aspects of the present disclosure operate with various modifications and in alternative forms. Specific aspects have been shown by way of example in the drawings and are described in detail herein below. However, it should be noted that the examples disclosed herein are presented for the purposes of clarity of discussion and are not intended to limit the scope of the general concepts disclosed to the specific examples described herein unless expressly limited. As such, the present disclosure is intended to cover all modifications, equivalents, and alternatives of the described aspects in light of the attached drawings and claims.

References in the specification to embodiment, aspect, example, etc., indicate that the described item may include a particular feature, structure, or characteristic. However, every disclosed aspect may or may not necessarily include that particular feature, structure, or characteristic. Moreover, such phrases are not necessarily referring to the same aspect unless specifically noted. Further, when a particular feature, structure, or characteristic is described in connection with a particular aspect, such feature, structure, or characteristic can be employed in connection with another disclosed aspect whether or not such feature is explicitly described in conjunction with such other disclosed aspect.

The disclosed aspects may be implemented, in some cases, in hardware, firmware, software, or any combination thereof. The disclosed aspects may also be implemented as instructions carried by or stored on one or more or computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include Random Access Memory (RAM), Read Only Memory (ROM), Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

EXAMPLES

Illustrative examples of the technologies disclosed herein are provided below. An embodiment of the technologies may include any one or more, and any combination of, the examples described below.

Example 1 includes a waveform monitor device to monitor a video signal, comprising an input to receive the video signal, the video signal including a plurality of frames, a memory to store the received video signal, and a processor, coupled to the memory. The processor is configured to separate the video signal into at least two component signals, for at least one component signal, determine a peak value of at least one component signal for at least one frame of the plurality of frames, generate a marker at the peak value, determine whether the peak value violates a predetermined threshold, and generate an alert when the peak value violates the predetermined threshold. The waveform monitor device also comprises a display to display the at least one component signal, the marker at the peak value on the component signal and the alert when the peak value violates the predetermined threshold.

Example 2 includes the waveform monitor device of example 1, wherein the processor generates the marker at the peak value for a predetermined amount of time.

Example 3 includes the waveform monitor device of example 2, further comprising a user input to receive the predetermined amount of time to generate the marker at the peak value.

Example 4 includes the waveform monitor device of any one of examples 1-3, wherein the processor generates the alert by changing a color of the marker based on whether the peak value violates the predetermined threshold.

Example 5 includes the waveform monitor device of any one of examples 1-4, wherein the processor further determines a minimum value of the at least one component signal for the at least one frame of the plurality of frames, generates a marker at the minimum value, compares the minimum value to a second predetermined threshold and generates an alert if the minimum value violates the second predetermined threshold.

Example 6 includes the waveform monitor device of any one of examples 1-5, wherein processor determines a standard or color space of the video signal and selects the predetermined threshold based on the standard or color space.

Example 7 includes the waveform monitor device of any one of examples 1-6, wherein the video signal is a compressed video signal.

Example 8 includes the waveform monitor device of any one of examples 1-7, wherein the video signal is received through an internet protocol (IP) input.

Example 9 includes the waveform monitor device of any one of examples 1-8, wherein the processor generates a minimum value of the at least one component signal, a maximum value of the at least one component signal, and an average value of the at least one component signal.

Example 10 is a method for alerting a user of a video signal violation, the method comprising receiving the video signal, the video signal including a plurality of frames, separating the video signal into at least two component signals, determining a peak value of at least one component signal for at least one frame of the plurality of frames, generating a marker at the peak value, comparing the peak value to a predetermined threshold, generating an alert if the peak value violates the predetermined threshold, and displaying on a display the at least one component signal, the marker at the peak value on the component signal and alert a user if the peak value is greater than the predetermined threshold.

Example 11 is the method of example 10, further comprising determining a peak value of each of the at least two component signals, generating a marker at the peak value for each of the at least two component signals, generating an alert if the peak value of either of the at least two component signals violates a predetermined threshold, and displaying on the display the at least two component signals, the marker at the peak value on each of the at least two component signals, and the alert.

Example 12 is the method of any one of examples 10-11, further comprising generating the marker at the peak value for a predetermined amount of time.

Example 13 is the method of any one of examples 10-12, further comprising generating the alert by changing the color of the marker based on whether the peak value violates the predetermined threshold.

Example 14 is the method of any one of examples 10-13, further comprising determining a minimum value of the at least one component signal for the at least one frame of the plurality of frames, generating a marker at the minimum value, comparing the minimum value to a second predetermined threshold, and generating an alert if the minimum value violates the second predetermined threshold.

Example 15 is a computer readable storage medium having instructions stored thereon that, when executed by a processor of a media analysis device, cause the media analysis device to separate a received video signal into at least two component signals, determine a peak value of at least one component signal for at least one frame of a plurality of frames, determines if the peak value violates a predetermined threshold, generate an alert when the peak value violates the predetermined threshold; and display on a display the at least one component signal and the alert.

Example 16 is the computer readable storage medium of example 15, wherein the instructions stored thereon further cause the media analysis device to generate a marker at the peak value for a predetermined amount of time.

Example 17 is the computer readable storage medium of any one of examples 15 and 16, wherein the instructions stored thereon further cause the media analysis device to generate the alert by changing a color of the marker based on whether the peak value violates the predetermined threshold.

Example 18 is the computer readable storage medium of any one of examples 15-17, wherein the instructions stored thereon further cause the media analysis device to determine a standard of the video signal and select the predetermined threshold based on the standard.

Examples 19 is the computer readable storage medium of any one of examples 15-18, wherein the video signal is received through an internet protocol (IP) input.

Example 20 is the computer readable storage medium of any one of examples 15-19, wherein the instructions stored thereon further cause the media analysis device to determine the peak value for each frame of the plurality of frames, plot the peak value for each frame in a graph, and determine if any of the peak values violate the predetermined threshold.

The previously described versions of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. Where a particular feature is disclosed in the context of a particular aspect or example, that feature can also be used, to the extent possible, in the context of other aspects and examples.

Also, when reference is made in this application to a method having two or more defined steps or operations, the defined steps or operations can be carried out in any order or simultaneously, unless the context excludes those possibilities.

Although specific examples of the invention have been illustrated and described for purposes of illustration, it will be understood that various modifications may be made without departing from the spirit and scope of the invention. Accordingly, the invention should not be limited except as by the appended claims.

What is claimed is:

1. A waveform monitor device to monitor a video signal, comprising:
    an input to receive the video signal, the video signal including a plurality of frames;
    a memory to store the received video signal;
    a processor, coupled to the memory, configured to:
        separate the video signal into a plurality of component video signals,
        determine a peak value of a plurality of pixels of at least one component video signal of the plurality of component video signals for at least one frame of the plurality of frames,
        generate a marker at the peak value,
        determine whether the peak value violates a predetermined threshold, and
        generate an alert when the peak value violates the predetermined threshold; and
    a display to display the at least one component video signal, the marker at the peak value on the component video signal and the alert when the peak value violates the predetermined threshold.

2. The waveform monitor device of claim 1, wherein the processor generates the marker at the peak value for a predetermined amount of time.

3. The waveform monitor device of claim 2, further comprising a user input to receive the predetermined amount of time to generate the marker at the peak value.

4. The waveform monitor device of claim 1, wherein the processor generates the alert by changing a color of the marker based on whether the peak value violates the predetermined threshold.

5. The waveform monitor device of claim 1, wherein the processor further determines a minimum value of the plurality of pixels of the at least one component video signal for the at least one frame of the plurality of frames, generates a marker at the minimum value, compares the minimum value to a second predetermined threshold and generates an alert if the minimum value violates the second predetermined threshold.

6. The waveform monitor device of claim 1, wherein processor determines a standard or color space of the video signal and selects the predetermined threshold based on the standard or color space.

7. The waveform monitor device of claim 1, wherein the video signal is a compressed video signal.

8. The waveform monitor device of claim 1, wherein the video signal is received through an internet protocol (IP) input.

9. The waveform monitor device of claim 1, wherein the processor generates a minimum value of the plurality of pixels of the at least one component video signal, a maximum value of the plurality of pixels of the at least one component signal, and an average value of the plurality of pixels of the at least one component signal.

10. A method for alerting a user of a video signal violation, the method comprising:
receiving the video signal, the video signal including a plurality of frames;
separating the video signal into a plurality of component video signals;
determining a peak value of a plurality of pixels of at least one component video signal of the plurality of component video signals for at least one frame of the plurality of frames;
generating a marker at the peak value;
comparing the peak value to a predetermined threshold;
generating an alert if the peak value violates the predetermined threshold; and
displaying on a display the at least one component video signal, the marker at the peak value on the component video signal and alert a user if the peak value is greater than the predetermined threshold.

11. The method of claim 10, further comprising:
determining a peak value of a plurality of pixels of each of at least two component video signals of the plurality of component video signals;
generating a marker at the peak value for each of the at least two component video signals;
generating an alert if the peak value of either of the at least two component video signals violates a predetermined threshold; and
displaying on the display the at least two component video signals, the marker at the peak value on each of the at least two component video signals, and the alert.

12. The method of claim 10, further comprising generating the marker at the peak value for a predetermined amount of time.

13. The method of claim 10, further comprising generating the alert by changing the color of the marker based on whether the peak value violates the predetermined threshold.

14. The method of claim 10, further comprising:
determining a minimum value of the plurality of pixels of the at least one component video signal for the at least one frame of the plurality of frames;
generating a marker at the minimum value;
comparing the minimum value to a second predetermined threshold; and
generating an alert if the minimum value violates the second predetermined threshold.

15. A non-transitory computer readable storage medium having instructions stored thereon that, when executed by a processor of a media analysis device, cause the media analysis device to:
separate a received video signal into a plurality of component video signals;
determine a peak value of a plurality of pixels of at least one component video signal of the plurality of component video signals for at least one frame of a plurality of frames;
determine if the peak value violates a predetermined threshold;
generate an alert when the peak value violates the predetermined threshold; and
display on a display the at least one component video signal and the alert.

16. The computer readable storage medium of claim 15, wherein the instructions stored thereon further cause the media analysis device to generate a marker at the peak value for a predetermined amount of time.

17. The computer readable storage medium of claim 15, wherein the instructions stored thereon further cause the media analysis device to generate the alert by changing a color of the marker based on whether the peak value violates the predetermined threshold.

18. The computer readable storage medium of claim 15, wherein the instructions stored thereon further cause the media analysis device to determine a standard of the video signal and select the predetermined threshold based on the standard.

19. The computer readable storage medium of claim 15, wherein the video signal is received through an internet protocol (IP) input.

20. The computer readable storage medium of claim 15, wherein the instructions stored thereon further cause the media analysis device to:
determine the peak value for each frame of the plurality of frames;
plot the peak value for each frame in a graph; and
determine if any of the peak values violate the predetermined threshold.

* * * * *